April 11, 1939.  Z. W. KELLEY  2,153,716
PRESSURE RESPONSIVE DEVICE
Filed July 19, 1937  2 Sheets-Sheet 1
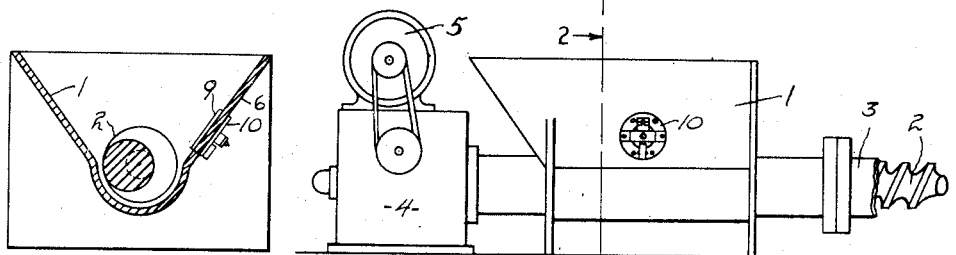
Fig 2    Fig 1
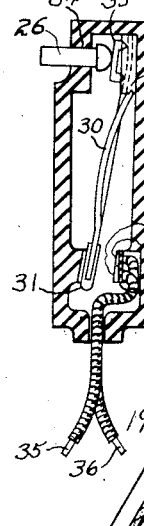
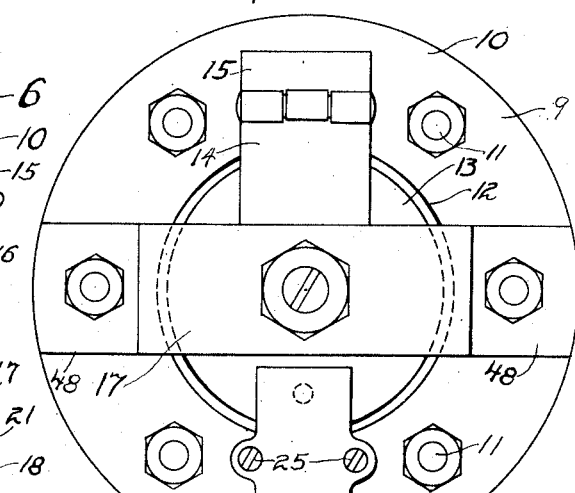
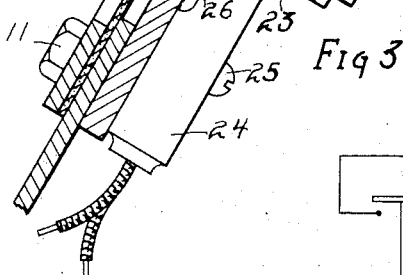
Fig 3
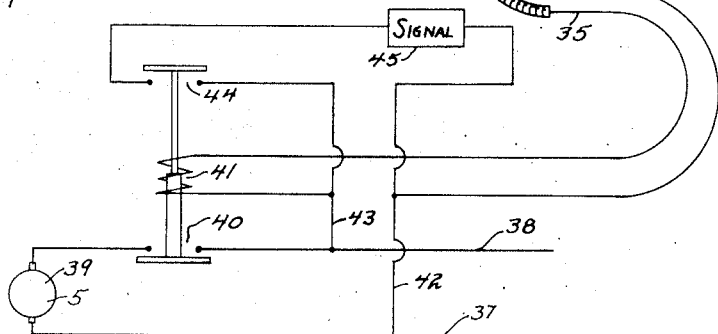
Zar W. Kelley INVENTOR.
BY Harry P. Canfield
ATTORNEY.

April 11, 1939.  Z. W. KELLEY  2,153,716
PRESSURE RESPONSIVE DEVICE
Filed July 19, 1937  2 Sheets-Sheet 2
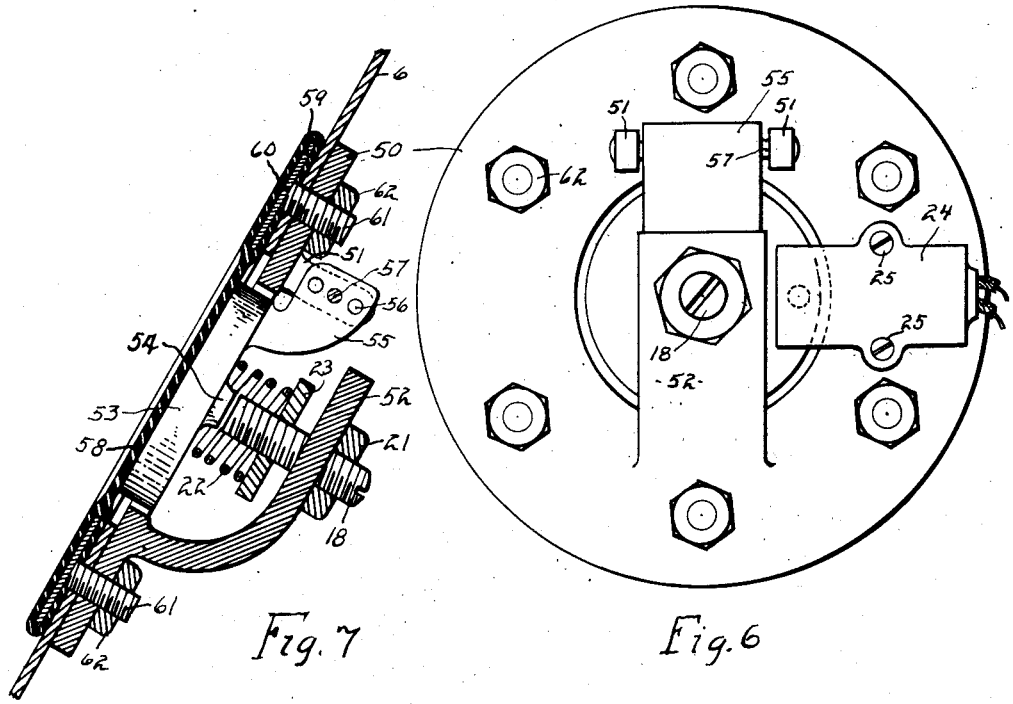
Zar W. Kelley INVENTOR.
BY Harry P. Canfield
ATTORNEY.

Patented Apr. 11, 1939

2,153,716

UNITED STATES PATENT OFFICE 2,153,716

PRESSURE RESPONSIVE DEVICE

Zar W. Kelley, Cleveland, Ohio, assignor to The Carpenter Heating & Stoker Company, Cleveland, Ohio, a corporation of Ohio Application July 19, 1937, Serial No. 154,464

6 Claims. (Cl. 200—52)

This invention relates to pressure responsive apparatus adapted for use in connection with a material container such as a bin, hopper, tank or the like, to actuate an electric circuit for any purpose when the level of the material in the container reaches a predetermined level.

While my invention may be applied to various uses, as will appear hereinafter, I have chosen to illustrate and describe the same as applied to the coal hopper of an automatic stoker to actuate a signal or to cut off the power to the motor operating the stoker feed mechanism, when the coal in the hopper has fallen to a predetermined low level.

Devices of this general class have been proposed heretofore, in which a part of the wall of the hopper or container is in the form of a flexible diaphragm subjected to the pressure of the contents in the hopper, and the movement of the diaphragm occasioned by changes of pressure thereon as the level of the contents of the hopper changes, has been used to operate an electric switch.

In all such prior devices however of which I am aware, the moving parts have been subjected to friction, rendering the operation thereof unreliable and not sufficiently sensitive, and relatively large movement of the diaphragm has been necessary to operate the electric switch, resulting in permanent distortion or breakage of the diaphragm, and in general such devices have not been sufficiently durable or reliable in use, or simple enough in construction or of sufficiently low cost to manufacture and assemble to bring them into general use.

It is therefore among the objects of this invention to provide:

A generally improved apparatus or pressure responsive device of the class referred to;

A pressure responsive device of the class referred to which will be reliable and durable in operation and simple and inexpensive to manufacture and install:

An apparatus of the class referred to comprising a pressure responsive means and an electric switch operable thereby having improved means to transmit movement of the pressure responsive means to the switch:

A device and apparatus of the class referred to having improved means to limit the movement of the pressure responsive element thereof.

An improved construction of diaphragm for devices and apparatus of the class referred to.

Other objects will be apparent to those skilled in the art to which my invention appertains.

My invention is fully disclosed in the following description taken in connection with the accompanying drawings in which Fig. 1 is a side elevational view in simplified form of a stoker coal hopper with an embodiment of my invention associated therewith;

Fig. 2 is a fragmentary sectional view taken from the plane 2 of Fig. 1;

Fig. 3 is a view illustrating to enlarged scale and in cross-section the embodiment of my invention illustrated in Figs. 1 and 2;

Fig. 4 is an elevational view taken approximately in the direction of the arrow 4 of Fig. 3.

Fig. 5 is a sectional view of one kind of electric switch which I may employ and which is illustrated in side and front elevational view in Figs. 3 and 4.

Figs. 6 and 7 are respectively views similar to Figs. 4 and 3, but showing a modification.

Referring to the drawings I have shown generally at 1 a coal hopper in the lower part of which is a feed screw 2, the screw extending forwardly from the hopper, in a conduit 3, toward and to the furnace to be fed, not shown. Rearwardly of the hopper the screw is driven by power supplied through a reduction gearing, not shown, but contained in a housing 4, by an electric motor 5 belted thereto. These parts are well known and constitute no essential part of the present invention.

The side wall 6 of the hopper has a large perforation or aperture 7 therein, see Fig. 3. A flexible diaphragm 8, of leather, rubber and canvas, or like suitable material covers the aperture 7 and is peripherally secured to the hopper wall by a ring 9 clamping it thereupon. An outer ring 10 is provided on the outside of the hopper, peripherally concentric with the inner ring 9 and the diaphragm, and the two rings are conveniently secured to the hopper wall 6 to mount them thereon and to clamp the diaphragm under the ring 9 by a plurality such as six bolts 11—11, extending through the rings, the diaphragm, and the hopper wall adjacent the periphery of the aperture 7.

The diaphragm 8 covers the aperture 7 and is in effect a part of the hopper wall, and coal or other contents of the hopper will press upon the diaphragm and by the weight thereof will tend to bend it outwardly. The ring 10 has, preferably at the center thereof a relatively large perforation or aperture 12, preferably opposite the center of the diaphragm. A movable disc 13 is disposed in the aperture 12, and if the aperture is circular the disc also is preferably circular and is slightly smaller than the aperture 12, and is mounted to move axially in the aperture 12 by being hinged to the ring 10. One element of the hinge, 14, is welded or otherwise secured to the disc and the other element, 15, of the hinge is welded or otherwise secured to the ring 10, and the two parts of the hinge 14 and 15 being connected together by a pintle 16. The disc 13 engages the outer wall of the diaphragm over a relatively large area thereof, and the disc and the ring 10 as clearly shown in the drawings support the diaphragm on the outside thereof to prevent undue flexing thereof by the weight of the material on the inside. A bridge 17 preferably formed from a strip of metal, has feet 48—48 on the opposite ends thereof, secured, by two diametrically disposed ones of the bolts 11—11, to the ring 10. The middle of the bridge 17 is disposed substantially over the center of the disc 13 and a stud 18 is threaded through the bridge and extends inwardly towards the disc 13 and terminates closely adjacent thereto. In the preferred construction, the disc is provided with a headed stud 19 driven into the center thereof and the stud 19 is closely spaced from the inner end of the stud 18, a small clearance as at 20 being provided.

The width of the space 20 may be adjusted by turning the stud 18, and the stud may be locked in any adjusted position by a lock nut 21. A spring 22 surrounds the stud and abuts at one end upon the disc 13 and at the other abuts upon a nut 23 adjustably threaded on the stud 18 under the bridge 17. The tension of the spring 22 opposes the outward movement of the diaphragm and disc 13.

At 24 is a switch housing which may be mounted upon the ring 10 in any suitable manner, as for example by screws 25—25, and a switch within the housing 24 is provided, adapted to be operated by a slight movement of a plunger 26 which rests upon the disc 13.

Any suitable construction of switch may be provided but I prefer to employ one which will operate on a small actuating movement. One such construction of switch is illustrated in the patent to McGall No. 1,960,020 issued May 22, 1934, to which reference may be had if desired. A switch of this general type in the housing 24 is illustrated in Fig. 5. A pair of stationary contacts 27 and 28 are mounted upon a support 29 within the housing 24. A sheet metal device 30 carries a movable contact 31 on one end thereof and the other end is hingingly mounted in a groove 32 within the housing. A rocker 33 rocks at one portion on the housing and at another portion on the device 30. The plunger 26 moves axially in a bore 34 in the housing wall, and when moved inwardly rocks the rocker 33 and tensions the device 30 in a manner to cause the movable contact 31 to snap over into engagement with and connect the stationary contacts 27 and 28; and when pressure on the plunger 26 is removed the device 30 will snap the movable contact 31 back to its contact disengaged position illustrated.

In the operation of this device, thus far described, when the hopper is filled with coal, the weight thereof on the diaphragm 8 and therefore upon the disc 13 engaging the diaphragm, moves the disc 13 outwardly, causing it to move the plunger 26 inwardly and operate the switch device within the housing 24 to close an electric circuit comprising the wires 35 and 36 which are connected to the contacts 27 and 28 in the housing for a purpose to be described.

The movement of the disc 13 is stopped by engagement of its stud 19 with the adjustable stud 18 and the weight of the coal on the diaphragm 8 is supported thereby to protect the diaphragm from damage.

The weight of coal necessary to thus move the diaphragm outwardly is determined by the force of the spring 22 which is adjustable by the nut 23 and therefore the height of coal in the hopper necessary to maintain the said switch operated may be determined by said spring. If the level of coal in the hopper should fall below a predetermined level determined by the spring 22, the spring will move the disc 13 outwardly and remove pressure from the plunger 26 which will cause the switch in the housing 24 to be restored.

One type of electric circuit and one characteristic control is illustrated in Fig. 4. Line wires 37 and 38 supply current to a motor 39, which may be the motor 5 above referred to, through a magnetic switch 40, having a winding 41. When the switch in the housing 24 is operated, to close its contacts, current may flow from the line 37 by a wire 42 through the wire 36 and through the switch, and back by the wire 35 through the winding 41, and by a wire 43 to the line 38, closing the switch 40. Whenever the switch in the housing 24 is restored, the winding 41 is deenergized and the switch 40 opens, stopping the motor; and if desired, a switch 44 may at the same time be closed to energize a signal 45 across the lines 37 and 38.

It will be observed that the disc 13 will move very sensitively with movements of the diaphragm 8 communicated thereto, with substantially no friction, because of its hinge support, this type of support, as is well known, providing the minimum friction. Also because of the small amount of movement permitted to the disc 13 by the studs 19 and 18, the diaphragm will have only a very limited movement and will never be unduly stressed. Also, since the ring 10, underlies substantially all of the diaphragm except that adjacent to disc 13, and the disc 13 substantially fills the aperture 12 in the ring 10, the diaphragm is supported at substantially its entire movable area.

The adjustment of the tension of the spring 22 and the adjustment of the stud 18 may both be effected independently of each other. The switch in the housing 24, being a complete unit in itself may be detached as a unit for renewal or repair, and again remounted as a unit. Furthermore, since the switch may be operated with very slight movement, there is no liability that the diaphragm will become bulged outwardly or strained through its range of movement, or cracked by continuous use. If desired, therefore, a metal diaphragm may be used.

In the form of my invention illustrated in Figs. 6 and 7, the outer ring 50 is in the form of a casting and has formed integral therewith a pair of ears 51—51, constituting one of the elements of a hinge. The ring 50 has also formed integral therewith an overhanging arm or bridge 52, in which the adjusting stud 18 described above is threadedly adjusted and secured by the lock nut 21.

The disc, 53 in this form, is also a casting and has formed integrally therewith a central boss 54 aligned with the inner end of the stud 18 and normally slightly spaced therefrom. The nut 23 and spring 22 co-operating with the disc 53 are substantially the same as the corresponding parts of the first described form.

The disc 53 has formed integral therewith a tongue 55 which is disposed between the said ears 51—51. The tongue 55 has a plurality such as three or four pintle-bores 56—56 therein; and a pintle-pin 57 is projected through aligned bores in the ears 51—51, and through a selected one of the bores 56 to complete the hinge connection between the disc and the ring.

The plurality of bores 56—56 provides adjustment for variably positioning the disc 53 to compensate for different thicknesses of the hopper wall 6, and so that for any wall thickness the disc 53 will in its normal position be substantially parallel, on its inner face, with the diaphragm 58 to be described.

The inner ring or annulus 59 has welded thereto as for example at 60, a circular series of studs 61—61 projecting axially therefrom. The ring 59 is plated or otherwise covered with rubber by well known processes and the rubber is formed to fill the space within the ring 59 in the form of a relatively thin web or diaphragm 58.

The rubber completely surrounds the annular ring 59 and the studs 61—61 project outwardly through the rubber as plainly shown in Fig. 7.

A diaphragm unit is thus provided consisting of the rubber covered ring 59 and studs 61—61, which may be handled as a unit in assembling the device on a hopper wall, and which may be removed as a unit for replacement purposes, and which may be manufactured and sold for a repair part as a unit.

Besides the advantages of the rubber diaphragm and its integral connection with the ring 59, the unit has a definite advantage that the studs 61—61 are integral therewith and separate bolts need not be provided.

The studs 61—61 are projected through perforations in the ring 50, and nuts 62—62 on the studs secure both the diaphragm unit and the ring 50 upon the hopper wall 6.

The switch housing 24 is mounted on the ring 50 by screws 25—25 as in the first described form.

In general, the mode of operation of the form of Figs. 6 and 7 is the same as that of Figs. 4 and 5, the differences being in the construction of individual parts thereof as described.

My invention is not limited to the exact species of construction illustrated and described. Many changes and modifications may be made within the spirit of my invention without sacrificing its advantages and within the scope of the appended claims.

I claim:

1. In a pressure responsive apparatus, associated with a bin or the like, a diaphragm arranged over an aperture in the wall of the bin, an inner ring holding the diaphragm on the bin wall, an outer ring on the bin wall secured thereto, and having an aperture therein coaxially of the diaphragm and smaller than the bin wall aperture, a disc in the outer ring aperture substantially filling the same and hingedly connected to the outer ring, a bridging member mounted on the outer ring and having an adjusting screw stud therein the inner end of which is adjacent to a portion of a disc, a spring abutting at one end on the disc to yieldingly hold it toward the diaphragm and in engagement therewith, an electric switch supported on the outer ring and means to communicate pressure effected movement of the disc to the switch to operate it.

2. A pressure responsive mechanism for indicating changes of level of material in a bin or the like, in combination with a bin wall having a perforation therein, comprising an outer element on the outside of the bin wall having an opening therein, a movable element hingedly supported on the outer element, and disposed in the perforation, a spring opposing outwardly hinging movement of the movable element, an electric switch comprising a movable switch operating element supported to be operated by outward hinging movement of the movable element, a diaphragm covering the perforation and engaged by the hingingly movable element, the diaphragm comprising an annulus covered with rubber and having the annulus opening bridged by a web of rubber integral therewith, and comprising studs extending axially from the annulus and extending through the bin wall and secured to the said outer element.

3. In a pressure responsive mechanism for indicating changes of level of material in a bin or the like, a bin wall provided with a perforation, a diaphragm covering the perforation, mechanism responsive to flexure of the diaphragm caused by variations of pressure on the diaphragm by contents of the bin, the diaphragm comprising an annulus covered with rubber, studs projecting axially from the annulus, and the opening within the annulus covered by a web of rubber integral with the annulus enclosing rubber, and means engaging the studs to mount the diaphragm on the bin wall.

4. A diaphragm construction for pressure responsive devices and the like comprising a substantially rigid annulus, a coating of rubber covering the annulus and a web of the rubber integral therewith covering the opening in the annulus, and a plurality of studs extending axially from the annulus integral therewith.

5. In a pressure responsive device associated with a bin or the like having an opening in the bin wall, a diaphragm secured to the inner face of the bin wall and covering the wall opening, an outer ring element secured to the outer wall of the bin and having a central opening extending entirely therethrough, a disc element in the ring opening substantially filling the same and movable therein axially of the opening, a hinge connecting the disc element to the ring on the outside thereof, a bridging member on the outer ring having a portion spaced from the disc element, a stud adjustably threaded through the bridge portion and terminating adjacent to, but spaced from, the disc element, a nut adjustably threaded on the stud, a spring surrounding the stud and abutting at one end on the disc element and at the other end on the nut, and an electric switch supported by the ring element and operable by movement of the disc element.

6. The device described in claim 5 and in which the hinge comprises a post on the outer ring element and an arm on the disc element, and means associated with the post and arm comprising a pintle pin and a plurality of pintle pin perforations whereby the hinging axis for the disc element may be adjustably positioned relative to the outer ring element.

ZAR W. KELLEY.